(No Model.)
M. C. DILLMAN.
FEEDER FOR THRASHING MACHINES.
No. 265,769. Patented Oct. 10, 1882.
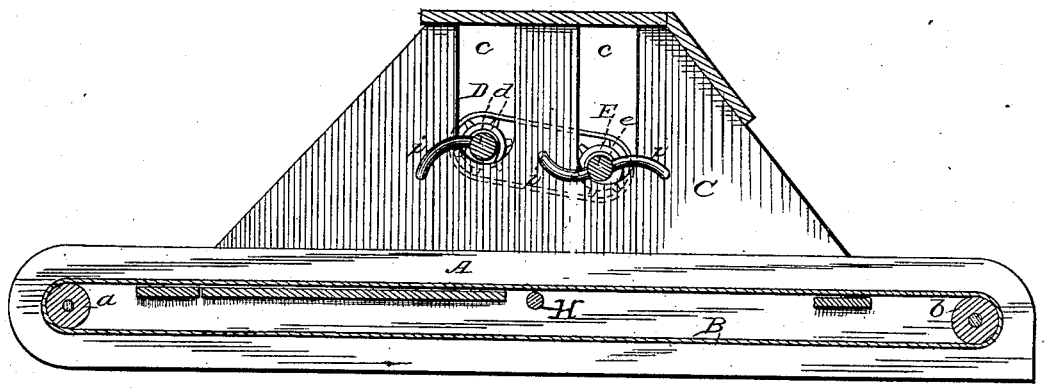
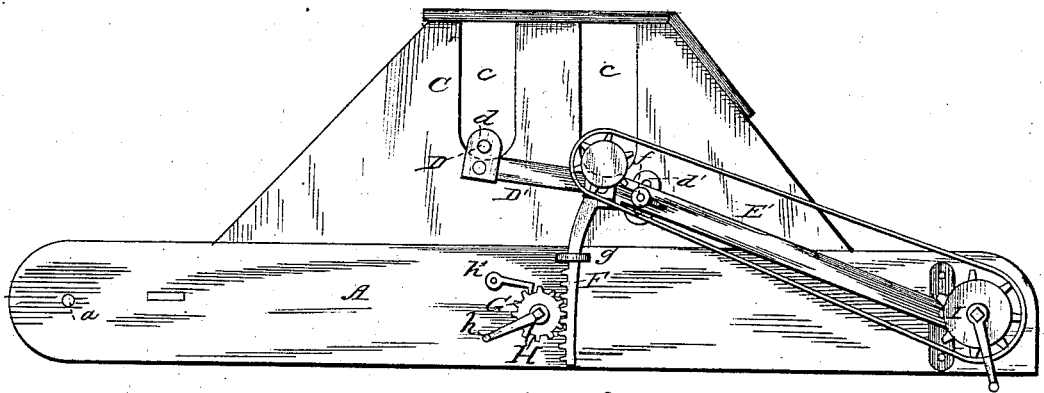
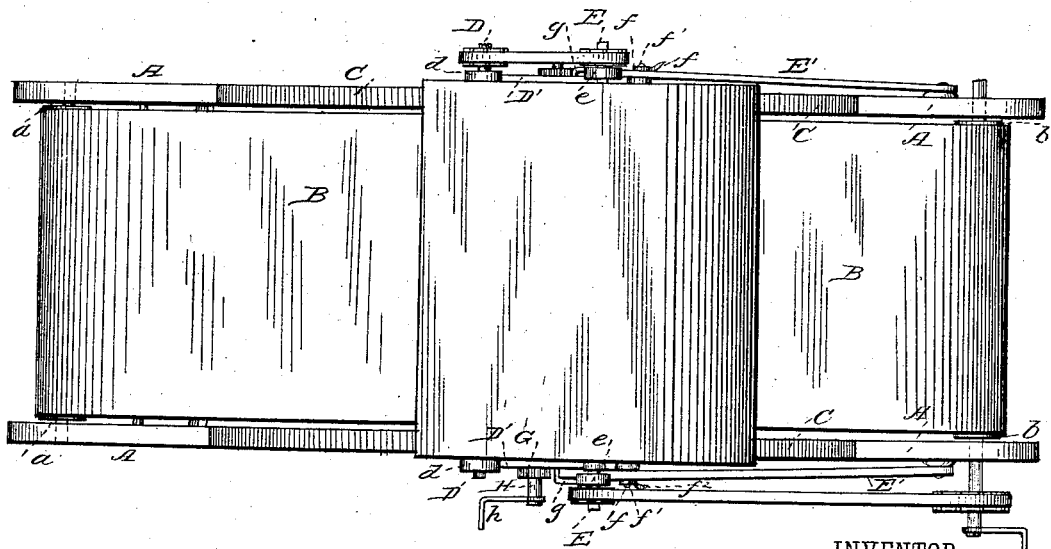
WITNESSES:
Fred. G. Dieterich
Jno. W. Stockett
INVENTOR.
Marshall C. Dillman
by N. W. Fitzgerald and Co.
ATTORNEYS.

UNITED STATES PATENT OFFICE.

MARSHALL C. DILLMAN, OF ORLAND, CALIFORNIA.

FEEDER FOR THRASHING-MACHINES.

SPECIFICATION forming part of Letters Patent No. 265,769, dated October 10, 1882.

Application filed April 12, 1882. (No model.)

*To all whom it may concern:*

Be it known that I, MARSHALL C. DILLMAN, of Orland, in the county of Colusa and State of California, have invented certain new and useful Improvements in Feeders for Thrashing-Machines; and I do hereby declare that the following is a full, clear, and exact description of the invention, which will enable others skilled in the art to which it appertains to make and use the same.

My invention relates to certain new and useful improvements in apparatus for automatically shaking or spreading out bundles of grain and feeding them into a thrashing-machine; and the invention consists in novel features of construction and combination and arrangement of parts, all as will be hereinafter fully described, and set forth in the claims hereto annexed.

Referring to the accompanying drawings, which form a part of this specification, Figure 1 represents a longitudinal vertical section; Fig. 2, a side elevation; Fig. 3, a top view or plan.

In the drawings, A represents a frame having a bottom to it, with a roller, $a$, at one end and a corresponding roller, $b$, at the opposite end, around which rollers extends an endless belt or carrier, B. The frame A is provided with casings C C, having vertical slots $c\ c$, through which project the ends of shafts D E, which are mounted in boxes or bearings $d\ e$, connected to the free ends of the side bars, D' E', arranged on the opposite sides of the frame A. The side bars E' are fulcrumed at their rear ends to the sides of the frame A, and to their front ends are fulcrumed the bars D', having at each rear end slotted guides $d'$, through which and the bars E' pass guide-pins $f f$, provided with screw-threaded ends $f'\ f'$, for the reception of the hand or thumb screw-nuts $f^2$, by which, when adjusted, they are secured in position. The side bars E' are provided at their front ends with downwardly-projecting rack-bars F F, passing through the guides $g$ and engaging with pinions G G, mounted on the transverse shaft H, having at one end an operating-crank, $h$, whereby said pinions can be revolved, thus raising or lowering the rack-bars and the side bars, D' E', carrying the shafts D E, and thereby permitting their being simultaneously adjusted and secured in any desired position by a pawl, $h'$, engaging the teeth of one of the pinions G. The shafts D E are provided with curved arms or spreaders $i$, which tend to separate and shake or spread out the bundles of grain, and also facilitate their forward movement in connection with the endless belt or carrier B. The armed or spreader shaft D, through the medium of the side bars D' and the slotted guides and guide-pins, is adapted to have a separate adjustment with reference to the armed or spreader shaft E, and both shafts are adapted to be vertically adjusted simultaneously with reference to the endless belt or carrier B for regulating the feed. The ends of the shaft E are provided with sprocket-wheels, over which pass endless drive chains or belts, that pass over sprocket-wheels on shafts D and I, the latter shaft being driven by any suitable connection with the thrashing-machine, thus communicating motion to the roller on shaft I and also the armed or spreader shafts D E by the connecting-bands and sprocket-wheels above described.

The operation is as follows: The apparatus being suitably located, so as to deliver into the thrashing-machine from one of its ends, the bundles of grain after the bands are cut are laid on the belt or carrier B at its other end. The movement of the belt or carrier carries the bundle lengthwise along the frame under the shaft D, the arms or spreaders of which tend to shake out and separate the bundle, the same operation being repeated by the armed or spreader shaft E, the arms of which serving to assist in feeding the grain forward, as well as separating and shaking it out loose in a fit condition to be fed into the machine, which last operation is performed as it passes from under the shaft E.

The above-described device produces a very simple and efficient apparatus, by which the entire operation is performed automatically.

Having thus fully described my invention, what I claim as new, and desire to secure by Letters Patent, is—

1. The combination, with the endless belt or carrier, of armed shafts D E, the adjustable side bars, D' E', having boxes $d\ e$ for said shafts, and toothed rack-bars and pinions for simultaneously adjusting the side bars and armed shafts, substantially in the manner herein shown, and for the purpose specified.

2. The combination of the fulcrumed side bars E' E', having boxes e, the side bars D' D', fulcrumed to the bars E' E', and having boxes d and slotted guides d', the guide-pins f f, and securing devices, and the armed shafts D E, substantially in the manner as and for the purpose herein shown and described.

In testimony that I claim the foregoing as my own I have hereto affixed my signature in presence of two witnesses.

MARSHALL C. DILLMAN.

Witnesses:
 THOMAS NICHOLLS,
 JOSEPH S. GREEN.